United States Patent
Yoshida et al.

(10) Patent No.: US 11,299,252 B2
(45) Date of Patent: Apr. 12, 2022

(54) RECTIFICATION STRUCTURE BODY AND FLYING VEHICLE

(71) Applicant: MITSUBISHI HEAVY INDUSTRIES, LTD., Tokyo (JP)

(72) Inventors: Rikako Yoshida, Tokyo (JP); Kosuke Nishikawa, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 84 days.

(21) Appl. No.: 16/639,188

(22) PCT Filed: Sep. 12, 2018

(86) PCT No.: PCT/JP2018/033744
§ 371 (c)(1),
(2) Date: Feb. 14, 2020

(87) PCT Pub. No.: WO2019/163173
PCT Pub. Date: Aug. 29, 2019

(65) Prior Publication Data
US 2020/0239124 A1 Jul. 30, 2020

(30) Foreign Application Priority Data
Feb. 23, 2018 (JP) ................... 2018-031130

(51) Int. Cl.
*B64C 1/38* (2006.01)
*B64C 3/36* (2006.01)
(Continued)

(52) U.S. Cl.
CPC .............. *B64C 1/38* (2013.01); *B64C 3/36* (2013.01); *B64D 27/16* (2013.01); *F02K 7/10* (2013.01)

(58) Field of Classification Search
CPC combination set(s) only.
See application file for complete search history.

(56) References Cited

U.S. PATENT DOCUMENTS

| | | | |
|---|---|---|---|
| 3,368,318 A | * | 2/1968 | Bennett, Jr. .............. B64C 1/38 52/787.12 |
| 5,000,998 A | | 3/1991 | Bendig et al. |

(Continued)

FOREIGN PATENT DOCUMENTS

| | | |
|---|---|---|
| JP | 60-155677 | 8/1985 |
| JP | 2015-197058 | 11/2015 |

OTHER PUBLICATIONS

English translation of the International Preliminary Report on Patentability dated Sep. 3, 2020 in International Application No. PCT/JP2018/033744.

(Continued)

*Primary Examiner* — Philip J Bonzell
*Assistant Examiner* — Ashesh Dangol
(74) *Attorney, Agent, or Firm* — Wenderoth, Lind & Ponack, L.L.P.

(57) ABSTRACT

A rectification structure body 100 of a flying vehicle is provided with a rectification section 30, a heat input control section 20 and a vacuum thermal insulation section 10. The rectification section 30 has a rectification surface 30a and a back surface 30b. The rectification surface 30a rectifies airflow 5 from a travelling direction. The back surface 30b is arranged opposite to the rectification surface 30a. The heat input control section 20 is connected to the back surface 30b. The vacuum thermal insulation section 10 is connected to the heat input control section 20 and its surface is formed of rigid body. In addition, the heat input control section 20 is sandwiched between the back surface 30b and the vacuum thermal insulation section 10.

11 Claims, 8 Drawing Sheets

(51) Int. Cl.
*B64D 27/16* (2006.01)
*F02K 7/10* (2006.01)

(56) References Cited

U.S. PATENT DOCUMENTS

| | | |
|---|---|---|
| 2009/0151321 A1 | 6/2009 | Jarmon et al. |
| 2010/0242486 A1 | 9/2010 | Jarmon et al. |
| 2017/0009665 A1 | 1/2017 | Ueno et al. |

OTHER PUBLICATIONS

International Search Report dated Nov. 27, 2018 in International (PCT) Application No. PCT/JP2018/033744.
Extended European Search Report dated Jun. 29, 2020 in corresponding European Patent Application No. 18906749.9.

* cited by examiner

FIG. 14

RECTIFICATION STRUCTURE BODY AND FLYING VEHICLE

TECHNICAL FIELD

The present invention relates to a rectification structure body and a flying vehicle.

BACKGROUND ART

Temperature of outer walls of flying vehicles provided with ramjet engine becomes high when flying speed thereof exceeds the speed of sound, due to aerodynamic heating. In order to protect inside of flying vehicle from heat, thermal insulation structure body is used on a surface of the flying vehicle.

Patent Literature 1 discloses a high temperature thermal insulation structure body formed of heat resistant metal plate and filled with porous metal body.

CITATION LIST

Patent Literature

[Patent Literature 1] Japanese Patent Publication No. S60-155677 A

SUMMARY OF INVENTION

In addition, a ramjet engine is subjected to a high air pressure at an inlet thereof. For this reason, a high strength is required to thermal insulation structure body to be used to an inlet. Herein, a thermal insulation structure body with a high strength can be obtained by forming a surface of thermal insulation material by metal plates; however, since metal plates transfer heat to inside of flying vehicles, metal plates cannot demonstrate performance as thermal insulation material. In addition, a ramjet engine needs to adjust the airflow at the inlet.

In view of above situation, an objective of the present invention is to provide a rectification structure body of a flying vehicle, having a high performance in thermal insulation and high strength. Other objectives will be understood with following descriptions and explanations of embodiments.

In order to achieve above described objective, a rectification structure body of flying vehicle according to a first embodiment of the present invention is provided with a rectification section, a heat input control section and a vacuum thermal insulation section. The rectification section is provided with a rectification surface that rectifies airflow from a travelling direction and a back surface opposite to the rectification surface. The heat input control section is connected to the back surface. The vacuum thermal insulation section is connected to the heat input control section and a surface thereof is formed of a rigid body. In addition, the heat input control section is sandwiched between the back surface and the vacuum thermal insulation section.

The above described vacuum thermal insulation section may be provided with a first surface where the heat input control section is attached and a side surface connected to an end of the first surface. The above described heat input control section may be provided with a predetermined distance from the side surface.

The above described heat input control section may be attached to a center of the first surface.

The above described rectification section may be provided with a rectification plate and a strengthening section. The rectification plate may be provided with the rectification surface. The strengthening section may be connected to the rectification plate and provided with the back surface. In addition, the strengthening section may be a hollow rigid body.

The above described strengthening section may be a lattice structure body.

The above described heat input control section may be a hollow rigid body.

The above described heat input control section may be a honeycomb structure body or a lattice structure body.

A plurality of the above described heat input control section may be connected to the vacuum thermal insulating section.

The above described rectification structure body of a flying vehicle may be further provided with a thermal insulation material between the vacuum thermal insulation section and the rectification section.

A flying vehicle according to a second embodiment of the present invention is provided with the above described rectification structure body.

The above described flying vehicle may be provided with a ramjet engine. The ramjet engine may be provided with an inlet having the above described rectification structure body.

The above described flying vehicle may be provided with a wing having the above described rectification structure body.

According to the present invention, the rectification structure body of a flying vehicle can realize a high thermal insulation performance and a high strength.

DESCRIPTION OF EMBODIMENTS

Embodiment 1

Figure 1:
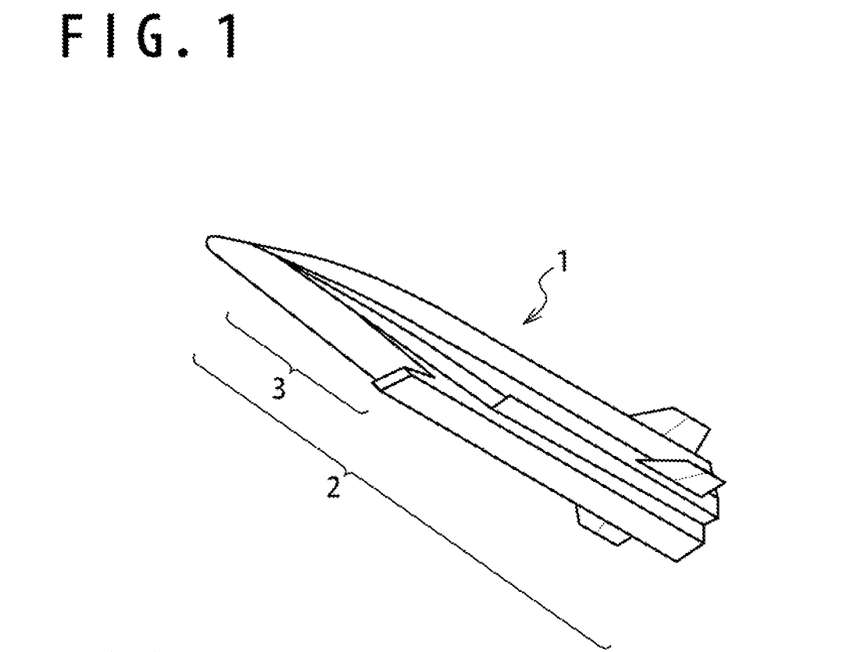
FIG. 1 is a diagram for describing a flying vehicle according to an embodiment 1.

A flying vehicle 1 related to the embodiment 1 is provided with a ramjet engine 2 as shown in FIG. 1. The ramjet engine 2 is provided with an inlet 3 for taking in air when the flying vehicle 1 flies. Herein, a travelling direction of the flying vehicle 1 will be referred to as the front.

Figure 2:
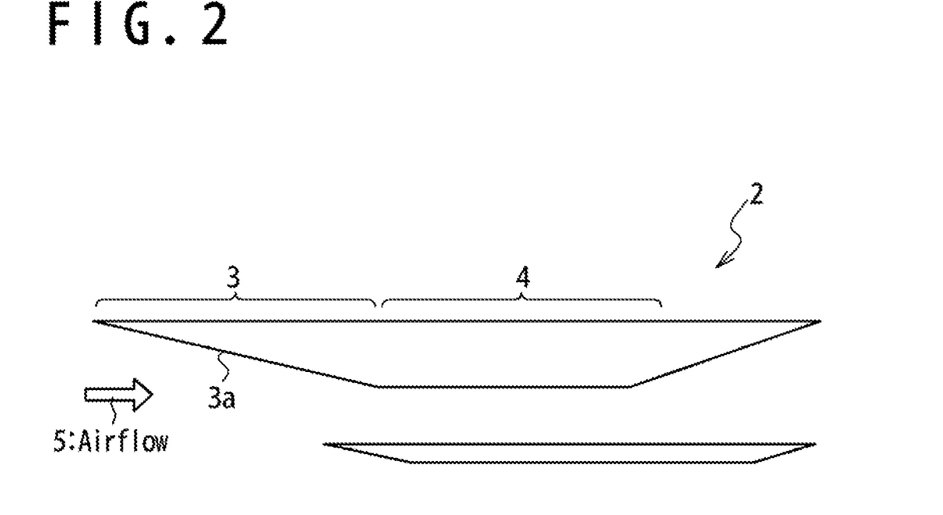
FIG. 2 is a schematic diagram showing a cross section of the ramjet engine in FIG. 1.

As shown in FIG. 2, the inlet 3 is provided in the front of the ramjet engine 2 and is provided with an inlet surface 3a configured to rectify airflow 5 from the travelling direction in order to take in air. A combustion section 4 is provided behind the inlet 3. The air taken in by the inlet 3 flows to the combustion section 4. The combustion section 4 mixes the air and fuel and combusts. The flying vehicle 1 obtains propulsion by this combustion. For this reason, the inlet surface 3a needs to flow the air that is taken in to the combustion section 4 without stagnation. Herein, since a speed of a flying vehicle 1 is high, the inlet surface 3a is subjected to a high pressure. Therefore, the inlet surface 3a is formed by a rigid body such as metal, because of high strength required.

Figure 3:
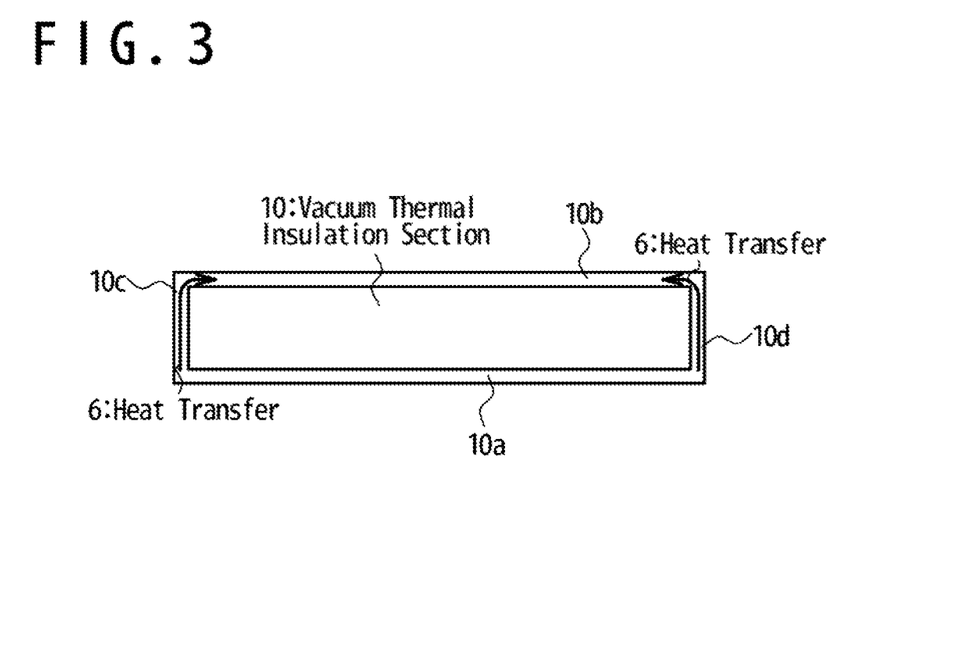
FIG. 3 is a schematic diagram showing a cross section of a vacuum thermal insulation section.

In addition, as shown in FIG. 2, the inlet surface 3a is inclined with respect to the travelling direction and is swollen with respect to the flow path of the airflow 5 as it goes backward. Furthermore, as a speed of the flying vehicle 1 is high, aerodynamic heat occurs on the inlet surface 3a. For this reason, temperature of the inlet surface 3a becomes high when the flying vehicle 1 flies. Therefore, the inlet 3 needs to work as thermal insulation material in order to protect inside of the flying vehicle 1 from heat. For this reason, as shown in FIG. 3, a use of a vacuum thermal insulation section 10 with thermal insulation material covered by metal plates (first plate 10a, second plate 10b, third plate 10c, fourth plate 10d) can be considered. However, temperature of whole the inlet surface 3a becomes high. That is, temperature becomes high at ends of the vacuum thermal insulation section (for example, a connection point between the first plate 10a and the third plate 10c). For this reason, the heat generated at connection point between the first plate 10a and the third plate 10c will be transferred to inside of the flying vehicle 1 through the third plate 10c (heat transfer 6), regardless of thermal insulation performance of the vacuum thermal insulation section 10. For this reason, enough thermal insulation performance cannot be obtained by a thermal insulation structure body covered by metal plates.

Figure 4:
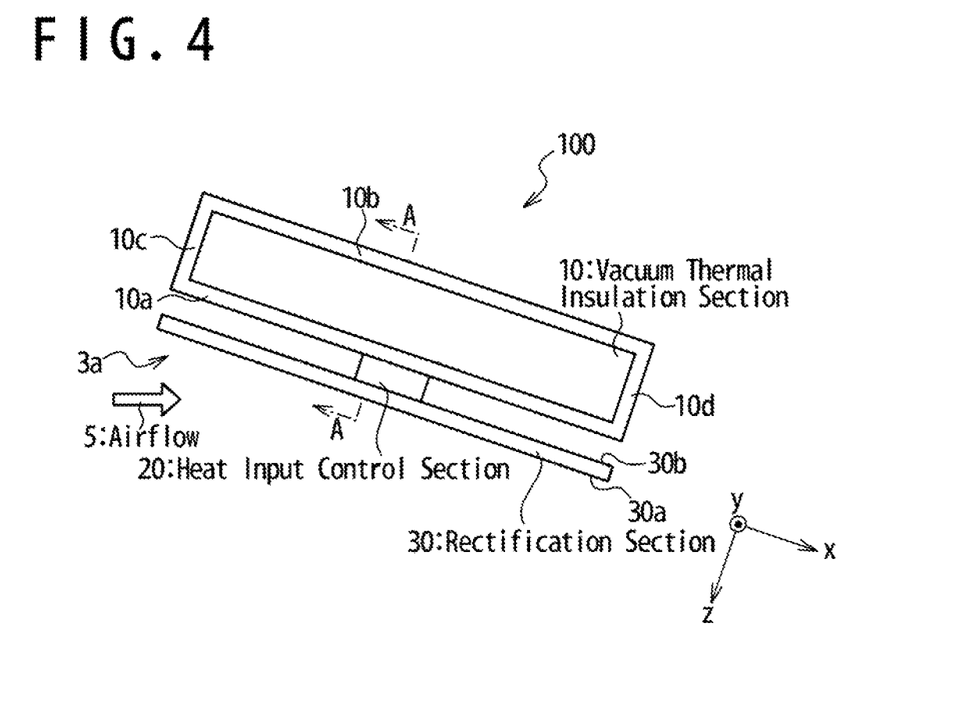
FIG. 4 is a schematic diagram showing a cross section of a rectification structure body applicable to the inlet in FIG. 2.

For this reason, the rectification structure body 100 provided to the inlet surface 3a is provided with a vacuum thermal insulation section 10, a heat input control section 20 and the rectification section 30, as shown in FIG. 4. Hereinafter, for an easier understanding, description will be carried out with z axis direction as a direction perpendicular to the inlet surface 3a and by defining a + direction in z axis as a direction from the inlet surface 3a to outside of the inlet 3. In addition, the description will be carried out by defining +x axis direction as rear direction of the flying vehicle 1 in the inlet surface 3a and y axis direction as a direction perpendicular to z axis and x axis, respectively.

The rectification section 30 is formed in a shape of plate and is provided with a rectification surface 30a that forms the inlet surface 3a. The rectification surface 30a rectifies airflow on a surface of the inlet surface 3a. In addition, the rectification surface 30a is subjected to a high air pressure. For this reason, the rectification surface 30a needs to keep its shape in order to rectify the airflow, even if subjected to air pressure. In order to obtain strength of the rectification surface 30a, the rectification section 30 is a solid rigid body having a thickness to withstand air pressure. In addition, the rectification section 30 is formed of a material with a high strength such as metal. For example, the rectification section 30 is formed of a rigid material such as heat resistant alloys, titanium alloys or the like.

Figure 5:
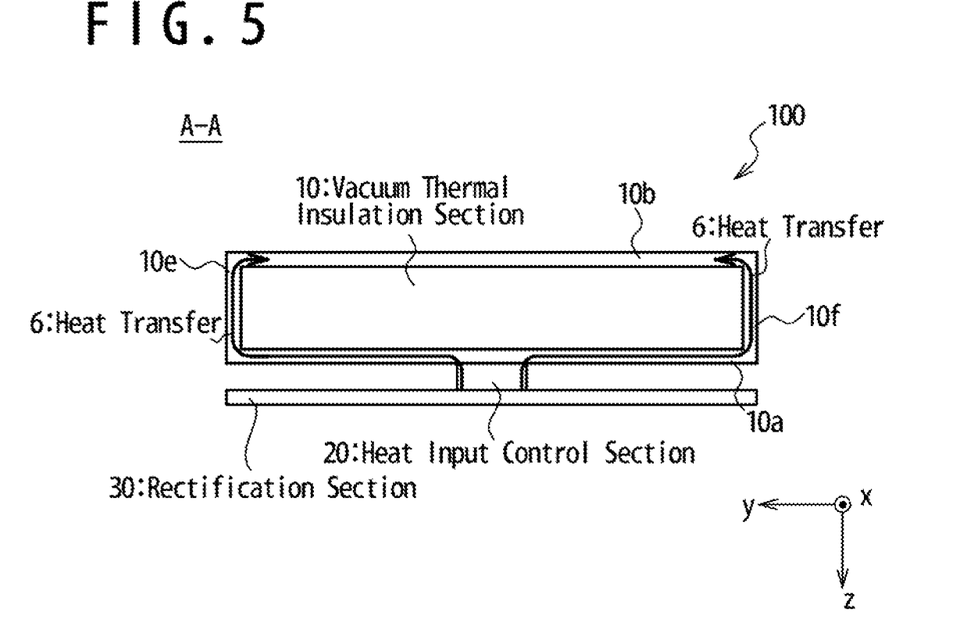
FIG. 5 is A-A cross sectional diagram in FIG. 4.

The vacuum thermal insulation section 10 is formed as a rectangular parallelepiped with the first plate 10a, the second plate 10b, the third plate 10c, the fourth plate 10d, the fifth plate 10e and the sixth plate 10f as surfaces thereof, as shown in FIGS. 4 and 5. The first plate 10a forms a surface of the vacuum thermal insulation section 10 in +z axis direction, that is, in a direction of the inlet surface 3a. An area of the first plate 10a, that is, sizes thereof in x axis direction and y axis direction, is/are equal to the one(s) of the rectification surface 30a. The second plate 10b is provided to face the first plate 10a. That is, the second plate 10b is on the opposite side of the first plate 10a. The third plate 10c, the fourth plate 10d, the fifth plate 10e and the sixth plate 10f are between the first 10a and the second 10b. In other words, the third plate 10c, the fourth plate 10d, the fifth plate 10e and the sixth plate 10f connect an end of the first plate 10a to an end of the second plate 10b. That is, when the first plate 10a is a bottom surface of the rectangular parallelepiped, the third to sixth plates 10c to 10f form side surfaces of the rectangular parallelepiped. Surface of the vacuum thermal insulation section 10 is formed of material with high strength such as metal in order to obtain enough strength. That is, the first plate 10a, the second plate 10b, the third plate 10c, the fourth plate 10d, the fifth plate 10e and the sixth plate 10f are rigid bodies formed of high strength such as metal. For example, heat resistance alloys, titanium alloys or the like are exemplified. When a reaching temperature of the vacuum thermal insulation section 10 is low, aluminum alloys may be used. In addition, the vacuum thermal insulation section 10 may be provided with a thermal insulation material inside. By providing thermal insulation material inside the vacuum thermal insulation section 10, the heat of the first plate 10a can be suppressed from transferring to the second plate 10b as radiant heat.

Figure 6:
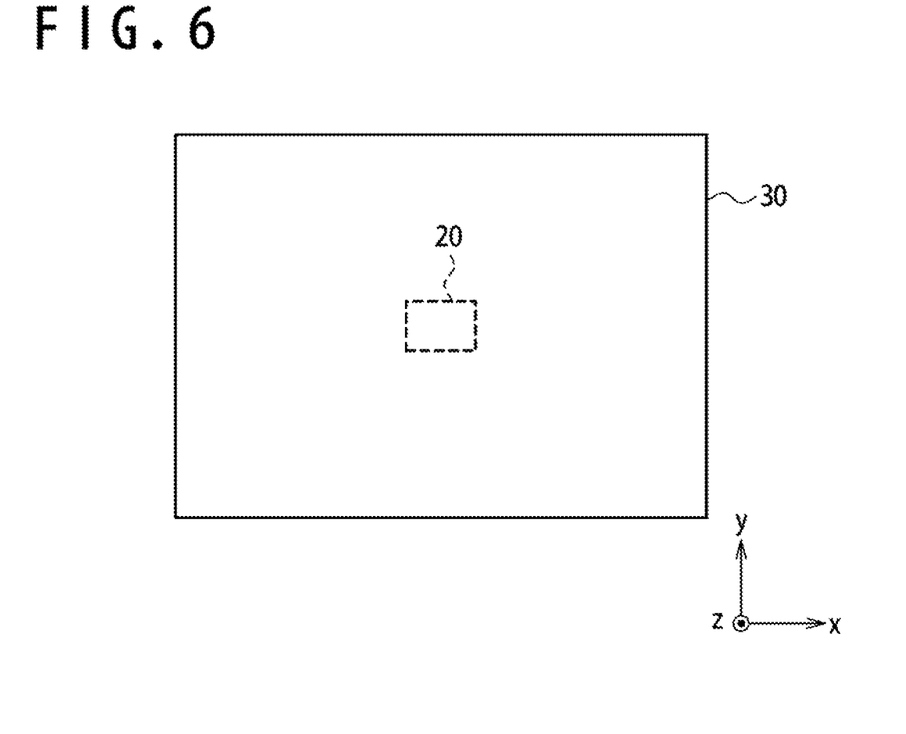
FIG. 6 is a plan view (in +z axis direction) of the rectification structure body in FIG. 4.

The heat input control section 20 is provided on the back surface 30b opposite to the rectification surface 30a and supports the rectification section 30. The heat input control section 20 is connected at a center of the back surface 30b, as shown in FIG. 6. In addition, the heat input control section 20 is arranged at a center of a surface of the first plate 10a and is supported by the vacuum thermal insulation section 10. For this reason, the heat input control section 20 is sandwiched between the rectification section 30 and the vacuum thermal insulation section 10. The heat input control section 20 is a rigid body formed of a material with a high strength such as metal, in order to support the rectification section 30. For example, the heat input control section 20 is formed of a rigid material such as heat resistant alloys, titanium alloys or the like.

The rectification structure body 100 may be provided with a thermal insulation material between the vacuum thermal insulation section 10 and the rectification section 30. In other words, the thermal insulation material may be arranged between the back surface 30b of the rectification section 30 and the first plate 10a. By providing the thermal insulation material between the vacuum thermal insulation section 10 and the rectification section 30, heat of the back surface 30b can be suppressed from being transferred to the first plate 10a as radiant heat. In addition, the strength of the rectification structure body 100 becomes higher because the thermal insulation material can support the rectification section 30. Ceramic-based thermal insulation materials such as silica, alumina or the like are included in this thermal insulation material, for example.

(Thermal Insulation Performance)

A thermal insulation performance of the rectification structure body 100 will be described. Temperature of the rectification surface 30a is increased by aerodynamic heat. In other words, the rectification section 30 is heated by the airflow 5. The heat added to the rectification section 30 moves to the heat input control section 20 that is connected thereto, as shown in FIG. 5. As a result, temperature of the heat input control section 20 increases. The heat input control section 20 is arranged at the center of the first plate 10a. For this reason, the heat added to the heat input control section 20 is transferred to the center of the first plate 10a. Herein, in the vacuum thermal insulation section 10, the heat is hardly transferred from the first plate 10a to the second plate 10b due to thermal insulation material or the like inside. For this reason, the heat added to the center of the first plate 10a moves to ends of the first plate 10a. As described above, the heat generated at the inlet surface 3a reaches inside the flying body 1 by transferring through the heat input control section 20, the central part of the first plate 10a, the end parts of the first plate 10a and the fifth plate 10e. As described above, by use of the heat input control section 20 and the rectification section 30, location of the vacuum thermal insulation section 10 for the heat to be inputted is limited. As a result, the thermal insulation performance of the vacuum thermal insulation section 10 can be demonstrated even if heat is added to whole surface of the rectification structure body 100.

(Method of Using)

A method of using the rectification structure body 100 will be described. The rectification structure body 100 rectifies flow of fluid at the flying vehicle 1 and is provided at part where heat is generated by aerodynamic heat or the like. Specifically, rectification structure body 100 is provided to parts where cooling system is not used for downsizing and weight saving. The rectification structure body 100 is provided to the inlet surface 3a, wings of the flying vehicle 1 (especially at connection part to fuselage) or the like, for example. In addition, the rectification structure body 100 may be provided to an inlet of a jet engine. Specifically, as shown in FIG. 4, the rectification structure body 100 is pasted at a predetermined location through the second plate 10b of the vacuum thermal insulation section 10. By doing so, a flow path where the fluid flows is formed by the rectification surface 30a. As a result, the flow of the fluid is rectified by the rectification surface 30a. In addition, since heat generated at the rectification surface 30a is transferred through the heat input control section 20, the first plate 10a and the third plate 10c to the sixth plate 10f, temperature of the second plate 10b is suppressed from increasing. In other words, temperature of a part where the second plate 10b of the rectification structure 100 is pasted is suppressed from increasing.

(Manufacturing Method)

An example of manufacturing method of the rectification structure body 100 will be described. A vacuum thermal insulation section of which surface is formed of metal is to be prepared. A heat input control section 20 with columnar shape and a rectification section 30 with plate shape is to be manufactured by use of metal. The heat input control section 20 is to be connected at a center of the vacuum thermal insulation section 10. In addition, the rectification section 30 is to be set to the heat input control section 20 so that the heat input control section 20 is at a center of the back surface 30b. By doing so, the rectification structure 100 can be manufactured. Herein, the heat input control section 20 and the rectification section 30 may be integrally manufactured. In addition, in case of arranging thermal insulation material between the rectification section 30 and the vacuum thermal insulation section 10, the thermal insulation material is to be filled between the rectification section 30 and the vacuum thermal insulation section 10.

Embodiment 2

Figure 7:
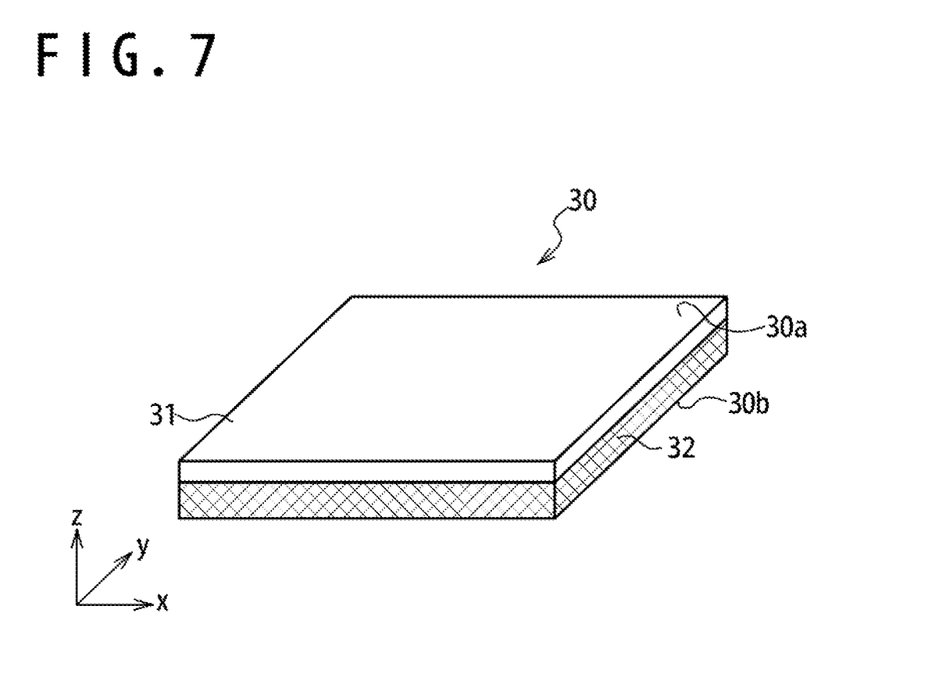
FIG. 7 is a perspective view of a rectification section related to an embodiment 2.

Although an example in which the rectification section 30 is a solid rigid body is shown in the embodiment 1, the present invention is not limited to this. In the embodiment 2, an example in which the rectification section 30 is provided with a rectification plate 31 that forms a rectification surface 30a and a strengthening section 32, as shown in FIG. 7, will be described. The heat input control section 20 and the vacuum thermal insulation section 10 are similar to the embodiment 1.

Figure 8:
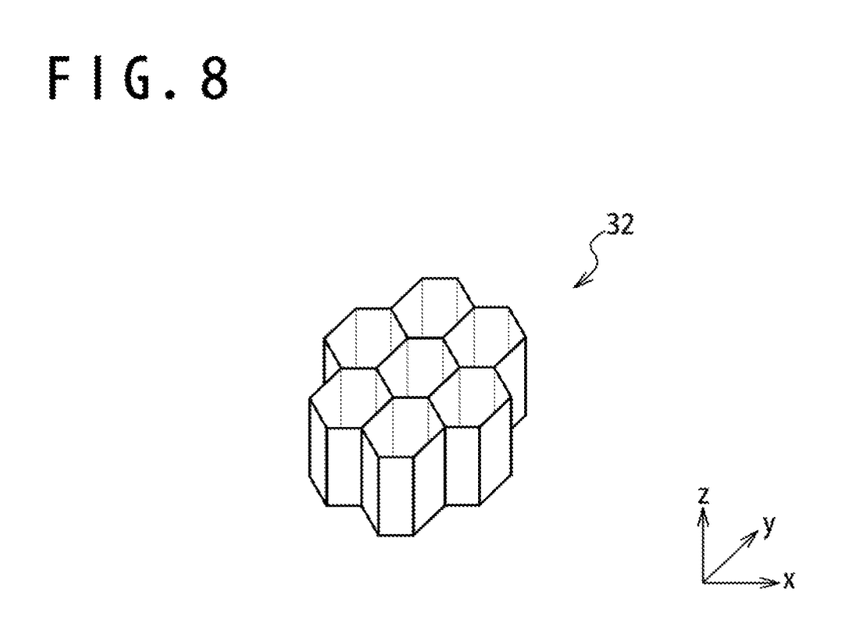
FIG. 8 is a diagram showing an example of the strengthening section in FIG. 7.

The strengthening section 32 is formed as a hollow rigid body. The strengthening section 32 may be, for example, a lattice structure body having a structure in which unit lattices 200, each of which is formed by connecting between a plurality of lattice points, are repeatedly and three-dimensionally arranged. In addition, as shown in FIG. 8, the strengthening section 32 may be a honeycomb structure body having a structure in which hexagonal columns, having cavities along a predetermined first direction, are arranged without gap in directions included in a plane perpendicular to this first direction. The strengthening section 32 may be a honeycomb structure body having a structure in which solid figures, that are not limited to hexagonal columns, having cavities along a first direction, are arranged without gap in directions included in a plane perpendicular to this first direction. When the strengthening section 32 is a honeycomb structure body, as shown in FIG. 8, the first direction along which the cavities that the honeycomb structure body has, is parallel to z axis direction, that is, the direction perpendicular to the rectification surface 30a. It should be noted that detail of the lattice structure body will be described below.

The rectification plate 31 is pasted on the strengthening section 32. For this reason, the strengthening section 32 increases strength of the rectification plate 31 and the thickness of the rectification plate 31 can be made thinner. As a result, the rectification surface 30a has enough strength and mass of the rectification section 30 is smaller. In addition, since the strengthening section 32 is of a hollow structure, the mass of the rectification section is further smaller.

In addition, heat added to the rectification surface 30a is transferred in an order of the rectification plate 31, the strengthening section 32 and the heat input control section 20. Since the strengthening section 32 is of a hollow structure, it has a thermal insulation performance similar to the embodiment or better.

The strengthening section 32 can be manufactured by use of a three-dimensional (3D) printer. For this reason, the rectification section 30 related to the variation example 1 can be manufactured by manufacturing the rectification plate 31 and the strengthening section 32 and pasting them. Therefore, the rectification structure body 100 related to the variation example 1 can be manufactured by use of manufactured rectification section 30, similarly to the embodiment. It should be noted that the rectification plate 31 and the strengthening section 32 may be integrally manufactured by use of a 3D printer.

Variation Example

Figure 9:
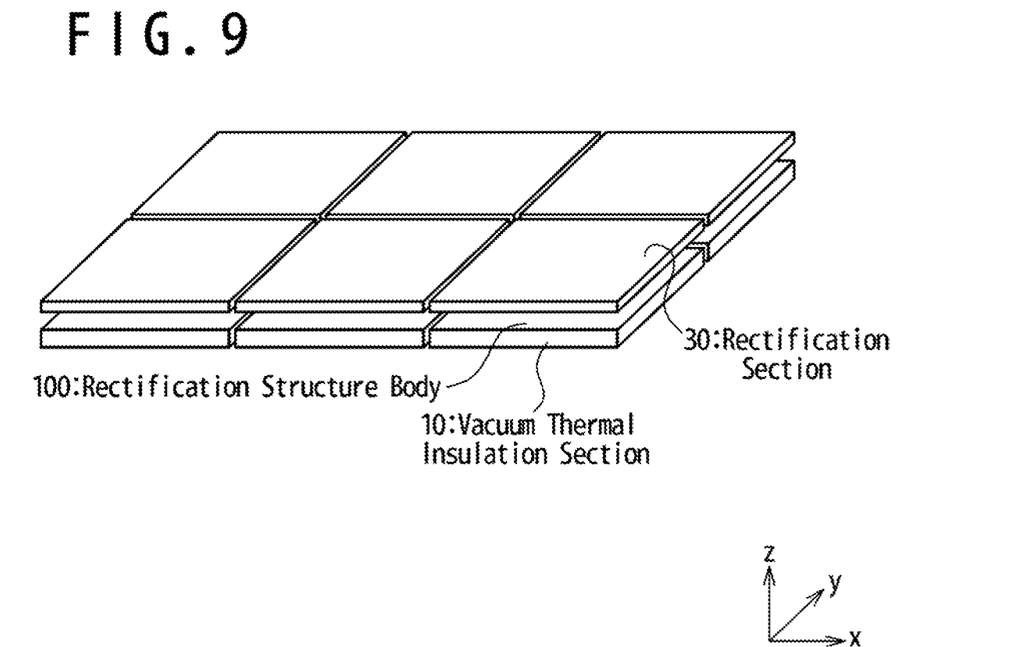
FIG. 9 is a diagram for describing an example of use of a plurality of rectification structure bodies.

When applying a rectification structure body 100 in a wide area, a plurality of rectification structure bodies 100 may be arranged side by side, as shown in FIG. 9. By laying down a plurality of rectification structure bodies 100, a surface of rectifying a flow of a fluid as a whole can be formed. For example, an inlet surface 3a of a flying vehicle 1 may be formed by a plurality of rectification structure bodies 100 that are arranged side by side.

Figure 10:
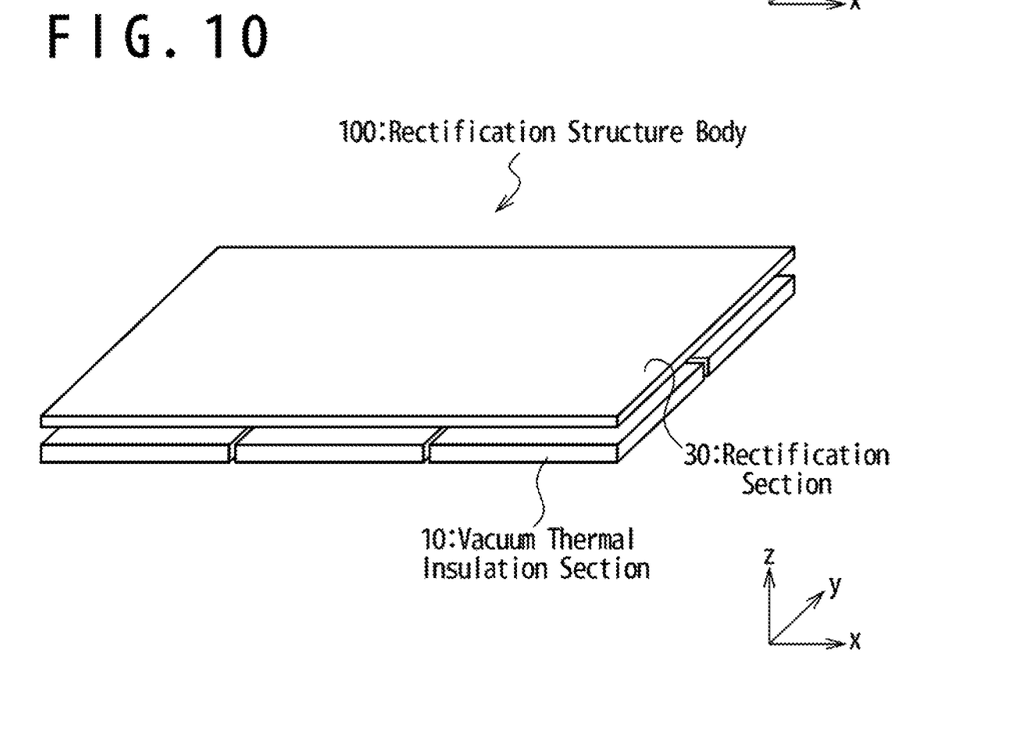
FIG. 10 is a diagram showing an example of a variation of FIG. 9.

In addition, as shown in FIG. 10, the rectification structure body 100 may be formed of a plurality of vacuum thermal insulation sections 10, a plurality of heat input control sections 20 and a single rectification section 30. In this case, a plurality of vacuum thermal insulation sections 10 are arranged side by side. A heat input control section 20 is arranged at a center of a first plate 10a of each vacuum thermal insulation section 10. A single rectification section 30 is connected to a plurality of heat input control sections 20.

Although the above embodiment shows an example with heat input control section 20 that are solid rigid body, the present invention is not limited to this example. The heat input control section 20 may be a hollow rigid body. For example, the heat input control section 20 may be a lattice structure body. In addition, the heat input control body 20 may be a honeycomb structure body having a structure in which solid figures, having cavities along a first direction, are arranged side by side without gap in directions included in a plane perpendicular to the first direction. When the heat input control section 20 is a honeycomb structure body, the first direction, along which the cavities that the honeycomb structure body has are, is parallel to z axis direction, that is, the direction perpendicular to the rectification surface 30a.

Figure 11:
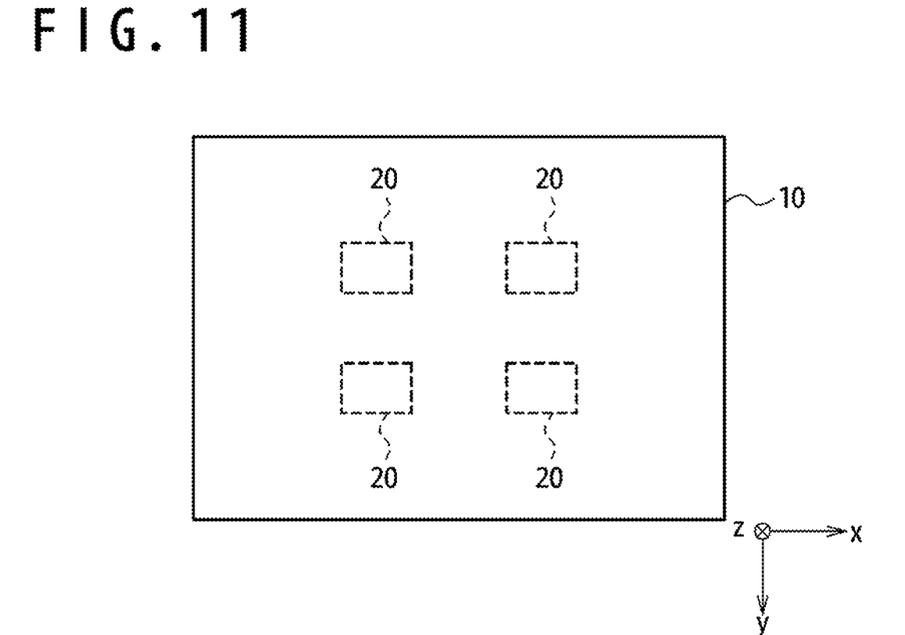
FIG. 11 is a bottom view (in −z axis direction) of an example of a variation of the rectification structure body.

Although the above embodiment shows an example of arranging the heat input control section 20 at a center of the first plate 10a, the present invention is not limited by this example. The heat input control section 20 may be arranged at an arbitrary location as long as thermal insulation performance of the vacuum thermal insulation section 10 can be demonstrated. For example, as shown in FIG. 11, the heat input control section 20 may be arranged at an arbitrary location separated from an end of the first plate 10a by a predetermined distance. In other words, the heat input control section 20 may be arranged at a location separated from a side surface of the vacuum thermal insulation section 10 (the third plate 10c for example) by a predetermined distance. In addition, the location of the back surface 30b of the rectification section 30 where the heat input control section 20 is arranged may be arbitrarily selected. In addition, the heat input control section 20 may be plural. It should be noted that the distance from an end of the first plate 10a to the location of connecting the heat input control section 20 is determined based on a thermal insulation performance required to the rectification structure body 100, a thermal conductivity of the first plate 10a, a thermal conductivity of the heat input control section 20, a thermal conductivity of the rectification section 30 or a combination thereof. When the required thermal insulation performance is lower, this distance may be shorter. In addition, when the thermal conductivity of each section is lower, this distance may be shorter. In other words, when the required thermal insulation performance is higher, this distance needs to be longer. In addition, when the thermal conductivity of each section is higher, this distance needs to be longer too.

Figure 12:
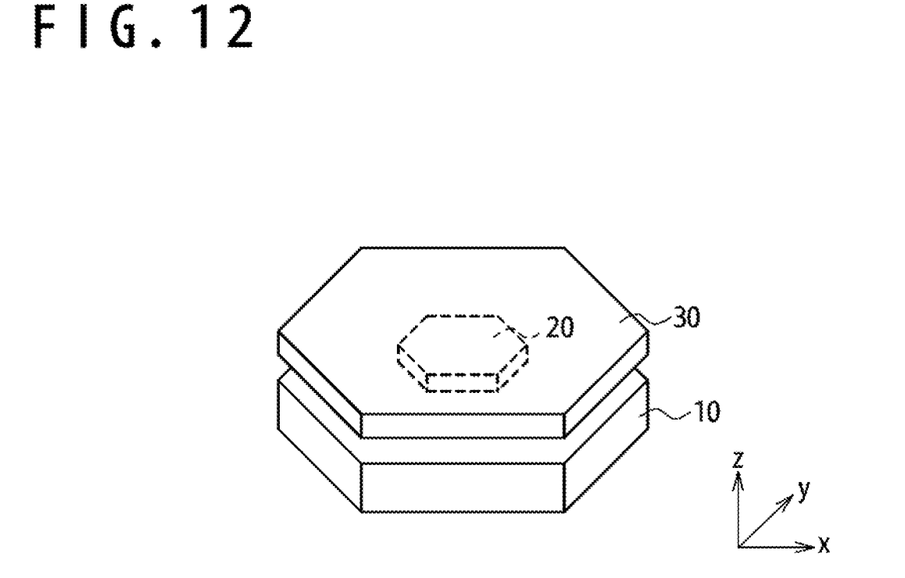
FIG. 12 is a perspective view of an example of a variation of the rectification structure body.

Although the above embodiment shows an example in which the vacuum thermal insulation section 10 is a rectangular parallelepiped provided with the first plate 10a to the sixth plate 10f, the present invention is not limited to this example. A shape of the vacuum thermal insulation section 10 may be arbitrarily selected as long as the surface thereof is formed of rigid body and the shape has a thermal insulation performance. For example, as shown in FIG. 12, the vacuum thermal insulation section 10 may have a hexagonal column shape. In addition, shapes of the heat input control section 20 and the rectification section 30 may be arbitrarily selected as long as the shape does not inhibit their function, similarly. For example, the heat input control section 20 and the rectification section 30 may have a hexagonal column shape. In addition, the vacuum thermal insulation section 10, the heat input control section 20 and the rectification section 30 may have shapes different from each other. Furthermore, the vacuum thermal insulation section 10 may be formed of two metal plates, the first plate 10a and the second plate 10b, of which ends are connected to each other.

Although the above embodiment shows an example in which the areas of the first plate 10a of the vacuum thermal insulation section 10 and the rectification surface 30a of the rectification section 30 are the same, that is, their lengths in x axis direction and y axis direction are respectively the same, the present invention is not limited by this example. As long as the rectification surface 30a is formed along the flow of the airflow 5, it may be larger than the area of the first plate 10a. In addition, the area of the rectification surface 30a may be smaller than the area of the first plate 10a.

In addition, a shape of the rectification section 32 may be arbitrarily selected as long as enough strength can be given to the rectification surface 30a. For example, the surface of the strengthening section 32, such as the back surface 30b and side surfaces for example, may be formed in a planar shape. In addition, the strengthening section 32 may be formed as end part of a lattice structure body or the like.

(Lattice Structure Body)

Figure 13:
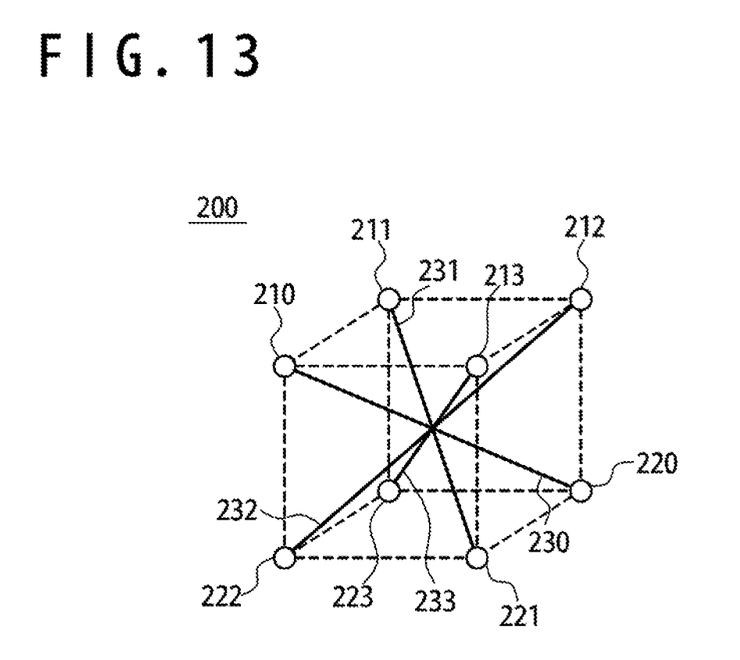
FIG. 13 is a perspective view showing an example of a unit lattice.
Figure 14:
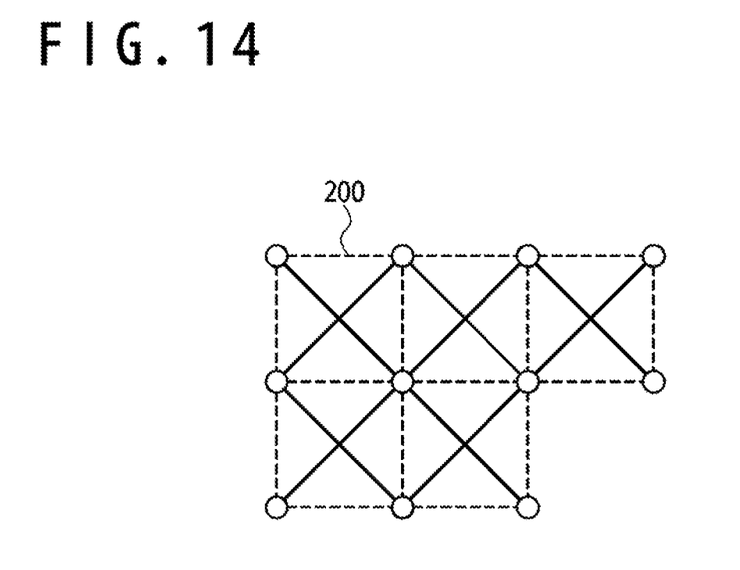
FIG. 14 is a top view of a lattice structure body using the unit lattices in FIG. 13.

A lattice structure body will be described. A lattice structure body has a shape formed of yarn parts connected in grids. For example, a lattice structure body has a shape in which unit lattices 200, formed by connecting between a plurality of lattice points, are repeatedly arranged side by side. A shape of the unit lattice 200 may be a shape of a cube, a rectangular parallelepiped, a hexagonal column or the like. For example, as shown in FIG. 13, the unit lattice 200 is formed to include a first yarn part 230, a second yarn part 231, a third yarn part 232 and a fourth yarn part 233. In addition, the unit lattice 200 has eight in total of lattice points at each vertex, from a first lattice point 210 to an eighth lattice point 223. The first yarn part 230 is formed along a line segment from the first lattice point 210 to the fifth lattice point 220 that is the farthest one therefrom. The second yarn part 231 is formed along a line segment from the second lattice point 211 to the sixth lattice point 221 that is the farthest one therefrom. The third yarn part 232 is formed along a line segment from the third lattice point 212 to the seventh lattice point 222 that is the farthest one therefrom. The fourth yarn part 233 is formed along a line segment from the fourth lattice point 213 to the eighth lattice point 223 that is the farthest one therefrom. As shown in FIG. 14, the lattice structure body includes a shape in which those unit lattices 200 are repeatedly arranged side by side. Herein, two arbitrary adjacent unit lattices 200 among the plurality of unit lattices 200 repeatedly arranged side by side may share at least one lattice point. In addition, a point in a unit lattice 200 may be arbitrarily selected as a lattice point. For example, a lattice point may be provided at a midpoint of an edge forming a unit lattice 200.

In addition, a lattice structure body may be of a shape in which groups of yarn parts along parallel line segments are three-dimensionally crossing. Distances between each group of yarn parts may be identical. In addition, distances between each group of yarn parts may be different based on locations.

Above described process is an example and order of each step and contents of process may be modified as long as the function is not inhibited. In addition, described configuration may be arbitrarily modified as long as the function is not inhibited.

It should be noted that the present application claims priority based on Japanese patent application No. 2018-031130 filed on Feb. 23, 2018 and all disclosure thereof is incorporated herein by reference.

The invention claimed is:

1. A rectification structure body of a flying vehicle, the rectification structure body comprising:
    a rectification section having a rectification surface configured to rectify airflow from a travelling direction and a back surface opposite to the rectification surface;
    a heat input control section connected to the back surface; and
    a vacuum thermal insulation section connected to the heat input control section,
    wherein the heat input control section is sandwiched between the back surface and the vacuum thermal insulation section,
    wherein the vacuum thermal insulation section comprises:
        a first plate forming a first surface of the vacuum thermal insulation section where the heat input control is arranged;
        a second plate provided so as to face the first plate on an opposite side of the vacuum thermal insulation section; and
        a further plate forming a side surface of the vacuum thermal insulation section connected to an end of the first surface,
    wherein the first plate, the second plate, and the further plate form a rigid body,
    wherein the heat input control section is arranged so as to be separated by a predetermined distance from the side surface such that heat added to the rectification section moves to the heat input control section and further to the second plate via the first plate, ends of first plate, and the further plate, and
    wherein the heat input control section is arranged at a center of the first surface.

2. The rectification structure body of a flying vehicle according to claim 1,
    wherein the rectification section comprises:
        a rectification plate having the rectification surface; and
        a strengthening section connected to the rectification plate and having the back surface,
    the strengthening section is a hollow rigid body.

3. The rectification structure body of a flying vehicle according to claim 2, wherein the strengthening section is a lattice structure body.

4. The rectification structure body of a flying vehicle according to claim 1, wherein the heat input control section is a hollow rigid body.

5. The rectification structure body of a flying vehicle according to claim 4, wherein the heat input control section is a honeycomb structure body or a lattice structure body.

6. The rectification structure body of a flying vehicle according to claim 1, wherein a plurality of the heat input control sections is connected to the vacuum thermal insulation section.

7. The rectification structure body of a flying vehicle according to claim 1, further comprising a thermal insulation material between the vacuum thermal insulation section and the rectification section.

8. A flying vehicle comprising the rectification structure body according to claim 1.

9. The flying vehicle according to claim 8, further comprising a ramjet engine, wherein the ramjet engine comprises an inlet having the rectification structure body.

10. The flying vehicle according to claim 8, further comprising a wing having the rectification structure body.

11. The rectification structure body of a flying vehicle according to claim 1, wherein the heat moves from the heat input control section to the second plate via the first plate, the ends of the first plate, and the further plate faster than through any other path.

* * * * *